United States Patent [19]

Hirsch et al.

[11] 4,420,676
[45] Dec. 13, 1983

[54] WELDING APPARATUS

[75] Inventors: Peter Hirsch, Aachen-Laurensberg; Bernhard Wübbels, Borken; Iwar Thomson, Aachen, all of Fed. Rep. of Germany

[73] Assignee: Friedrich Eichhorn, Aachen, Fed. Rep. of Germany

[21] Appl. No.: 258,051

[22] Filed: Apr. 28, 1981

[30] Foreign Application Priority Data

Apr. 30, 1980 [DE] Fed. Rep. of Germany ....... 3016582

[51] Int. Cl.³ .......................... H05B 1/00; B23K 25/00
[52] U.S. Cl. .................................... 219/160; 219/73.1; 219/126
[58] Field of Search ...................... 219/73.1, 126, 160, 219/72, 137.41; 228/216

[56] References Cited

U.S. PATENT DOCUMENTS 3,046,386 7/1962 Wooding et al. .................... 219/126
3,170,430 2/1965 Bistak ............................... 219/73.1 X
3,211,887 10/1965 Cotterman ...................... 219/73.1 X
3,281,570 10/1966 Wooding ............................. 219/126

FOREIGN PATENT DOCUMENTS 1165786 3/1964 Fed. Rep. of Germany .

Primary Examiner—B. A. Reynolds
Assistant Examiner—Catherine M. Sigda
Attorney, Agent, or Firm—Murray Schaffer

[57] ABSTRACT

An apparatus for safeguarding a welding pool in mechanized welding in a constrained position, for example a vertical position, comprises sliding blocks pressed against the surfaces of the work pieces to be welded and supplying the welding current and the welding electrode and moving at the welding rate. The sliding blocks comprise two segments which are closely adjacent in the perpendicular center plane of the welding gap between the work pieces and are mutually movable. The sliding block segments are pressed in a yielding manner against the surface of each work piece and are individually and independently movable.

23 Claims, 8 Drawing Figures (SECTION ALONG LINE II-II)

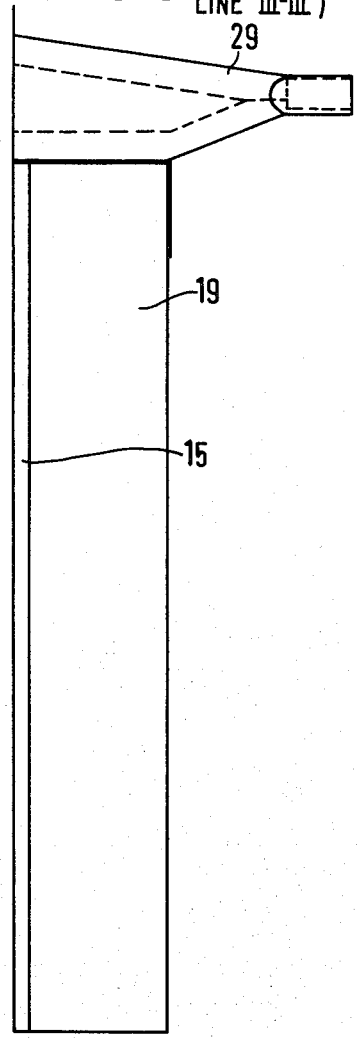
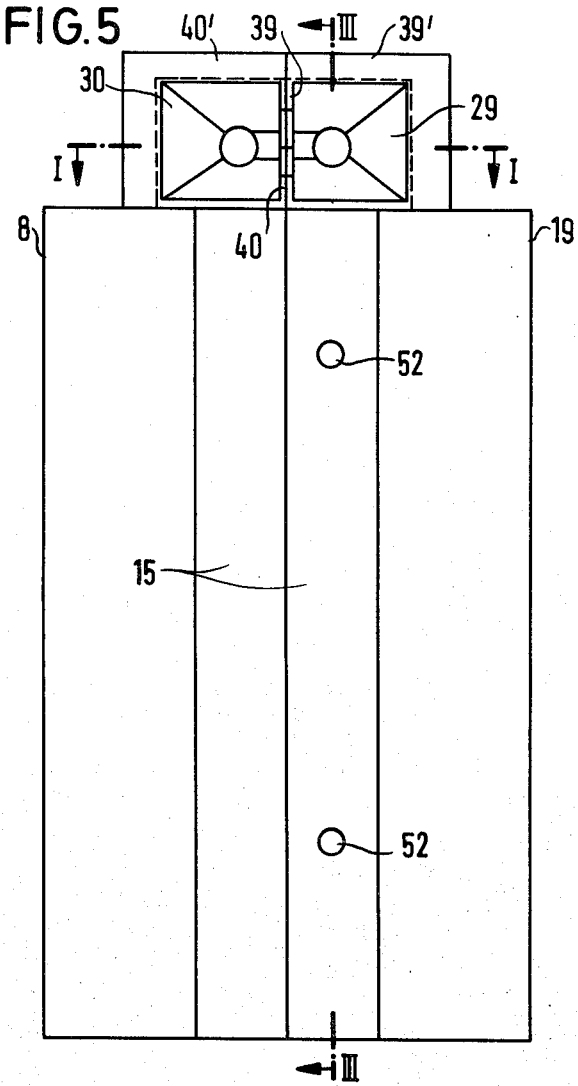
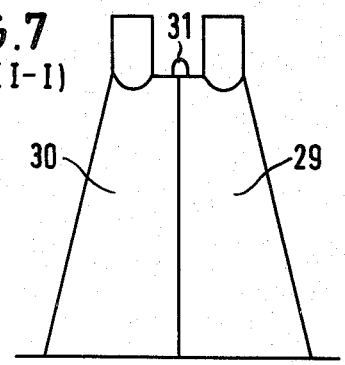

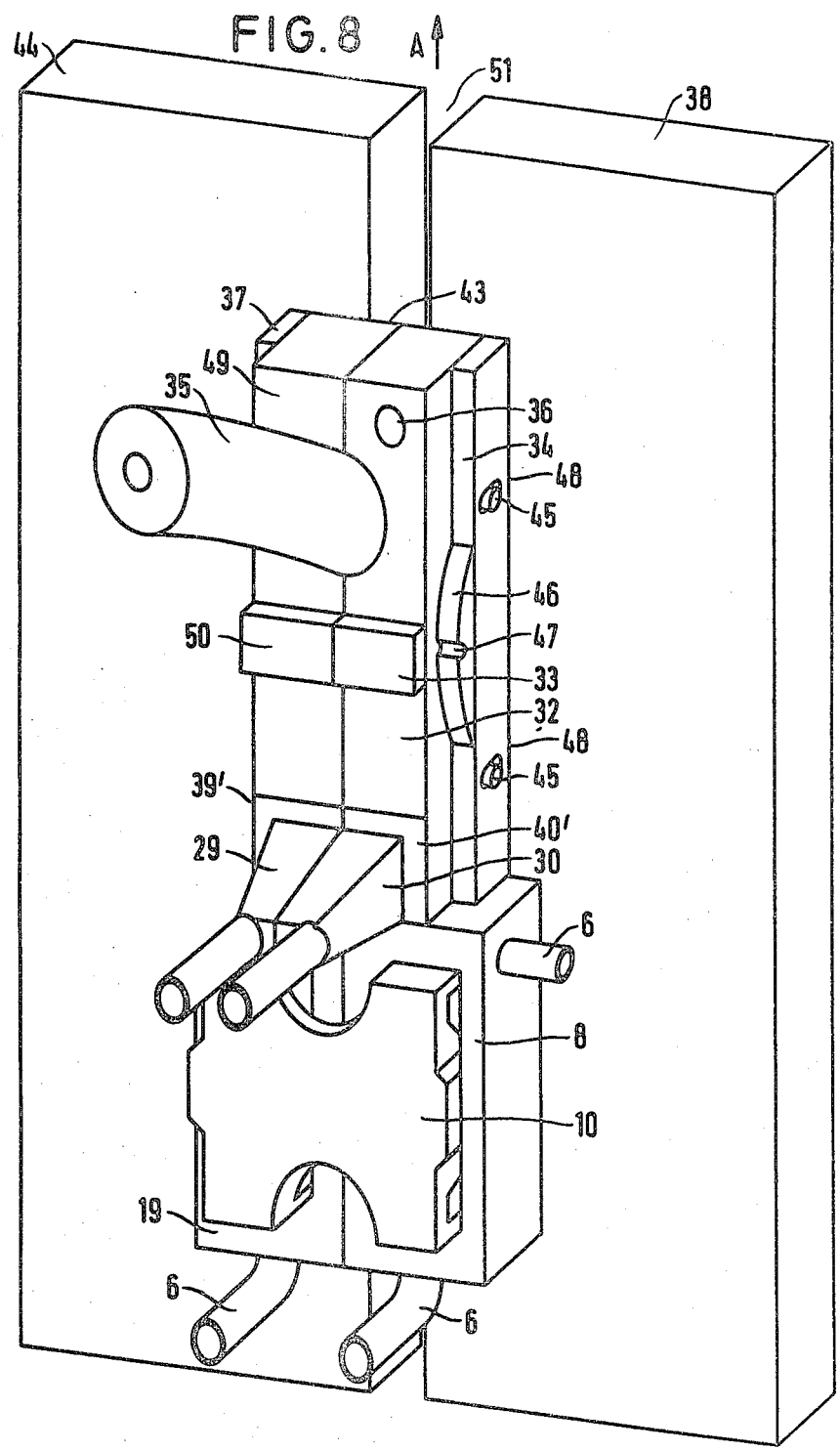

WELDING APPARATUS

FIELD OF THE INVENTION

This invention relates to a welding apparatus, and in particular an apparatus for safeguarding a pool in mechanical welding in a constrained position, in particular in an upright, for example a vertical position.

BACKGROUND OF THE INVENTION

German Auslegeschrift No. 1,165,786 discloses an apparatus which comprises sliding blocks which are pressed against the surface of the work pieces to be welded and supply the welding current and the welding electrode and move at the welding speed, and they consist of two segments which are mutually movable and are closely adjacent in the generally vertical centre plane of the welding gap between the work pieces.

An attempt is made to control the contact force of the two-part sliding blocks on the work pieces to be welded so that the force is always optimum even when the work pieces are irregular in shape, for example if they are curved. To achieve this, the segments are pressed by an elaborate lever apparatus having a single pressure spring on each side. Since the segments are only mutually movable to a limited extent, an effective, regular weld seam cannot be produced where there is a considerable edge mismatch of the two work piece edges to be welded or where there is a considerable mutual inclination of the work pieces. Lateral leakage of the melt cannot be reliably avoided.

German Auslegeschrift No. 1,096,515 and German Patent No. 1,108,352 disclose apparatus with which an effective lateral sealing of the pool is indeed achieved, but since the region positioned directly on the melting line is not cooled sufficiently when the sheets are uneven, considerable fluctuations occur in penetration. The positioning, known from elsewhere, of additional guide paths considerably increases the downtime and is not always suitable.

In the apparatus according to German Pat. No. 2,603,020, an effective sealing against the leakage of the pool is ensured by segmentation of the sliding surfaces, but the contact forces cannot be precisely determined due to the large area over which friction occurs between the individual segments.

SUMMARY OF THE INVENTION

The object of the present invention is to provide an improved apparatus of the type initially described such that even great inaccuracies with respect to the surfaces of the work pieces to be welded may be fully controlled. The apparatus is to be inexpensive and capable of producing an effective weld seam even in cases such as these.

According to the invention there is provided an apparatus for safeguarding a welding pool during mechanised welding of work pieces in a constrained position, comprising sliding blocks adapted to be pressed against the surface of the work pieces to be welded and supplying the welding current and the welding electrode and moving at the welding rate, the said blocks comprising two segments which are mutually movable and are closely adjacent to each other in a plane passing at least approximately through the centre of the welding gap between the work pieces, wherein means are provided for pressing the sliding block segments in a yielding manner against the surface of each work piece, the sliding block segments being individually movable independent of each other.

The segments being pressed against the surface of the work pieces and being individually movable independently of each other reliably compensate any error which arises in practice, in particular in the mutual position of the work pieces, such as an edge mismatch and a mutual incline, so that an effective weld seam is always ensured.

In a particular embodiment, the movability of the sliding block segments may be achieved by having the sliding block segments connected to a common holder, and each individuallly tiltable by a respective swivel joint having an axis perpendicular to the centre plane of the welding gap. The block segments are guided parallel to the centre plane and movable in a parallel direction towards the work piece. The holder is positioned in a machine frame by a connecting member and is movable longitudinally of the welding gap. In particular, provision may be made for the guidance of the sliding block segments parallel to the centre plane of the welding gap to use two pegs which are opposite in a plane parallel to the centre plane of the welding gap, the pegs each engaging in a slit lying in this plane towards the work piece. These slits are formed in a projection of the common holder, optionally having adjustable end stops. The arrangement may be such that spring pressure means, for example pneumatic or hydraulic cylinders, are positioned between each sliding block segment and the common holder.

A cooling agent may also flow through the sliding block segments, for which purpose the segments may be provided with corresponding throughflow channels for the cooling agent.

In order to prevent the metal and slag bath from leaking through the common longitudinal groove of the two segments when the welding process has started, the apparatus according to the invention may have a sealing body resiliently secured in yieldable manner to the lower side of each sliding block segment such that it is pushed back obliquely downwards by a cambered welding bead. These sealing bodies are closely adjacent in the centre plane of the welding gap, and have a common longitudinal groove in the extension of a common centre longitudinal groove of the sliding block segments, and the groove tapers off obliquely upstream of the lower end of each sealing body. In an embodiment, the sealing bodies are each penetrated by a bolt secured in the relevant sliding block segment, pointing rearwardly and obliquely downwards, and they are pressed against this segment by a spring with a disc and an attachment split pin.

It is also possible that in each specific case of use, a respective additional, identically-constructed segment is closed joined to the side of each sliding block segment, being independently movable and secured by an extended common holder.

Furthermore, an additional device may be provided for insert gas welding.

German Patent No. 1,140,297 and German Auslegeschrift No. 1,565,893 disclose supplying inset gas through the sliding block into the arc region of the welding gap. This operation has the disadvantage that where there are comparatively long seams and comparatively narrow welding gaps, the insert gas openings may be obscured to some extent by splashes, and this may result in turbulence and, consequently, may produce pores in the welded material. In order to overcome this disadvantage in the present invention, the inert gas is preferably directly supplied to the welding process via the sliding block. For this purpose, the apparatus according to the invention has an inert gas supply nozzle, which is preferably expanded in the direction of flow and is bent at the end, attached to each sliding block segment. These nozzles are closely adjacent and are mutually movable in the centre plane of the welding gap.

In order to avoid an injector effect, the gas supply is sealed off towards the outside. This may be achieved by making the inert gas supply nozzles at least partly from guide plates which are held in a housing firmly connected to each sliding block segment, the rear edge of the two inert gas supply nozzles preferably being bridged by a flexible sealing cap. In this arrangement, the housings of the inert gas supply nozzles may be assembled with a compartment housing divided in the centre plane of the welding gap, the parts of this compartment housing each being secured at the top to a respective one of the sliding block segments.

A specific excess pressure is maintained in the welding region by means of a pressure control device so that ambient air cannot be added. Particular attention is given to the sealing from the surroundings.

Inspection openings which have been sealed off are provided when designing the welding equipment.

The welding compartment may have the following features:

(a) It carries a wire electrode lead
(b) It has a pressure control device controlling the inert gas supply
(c) It contains at the top a suction opening for inert gas and fumes which escape
(d) At least one of the two parts of the compartment housing contains an opening provided with an inspection glass
(e) A respective sealing strip is attached to each side of the compartment housing and the inert gas supply nozzles, which strips are penetrated by bolts and slits cooperating therewith, extending towards the work pieces and they are pressed against the work pieces by springs secured to the housing parts, for example, by respective bolts.

The common longitudinal groove of the sliding block segments lying in the region of the welding gap, may be provided with bores for accommodating phototransistors or thermo-elements which are used for controlling the welding rate and the welding flux supply, the phototransistors or thermo-elements thus installed being protected from the welding heat.

BRIEF DESCRIPTION OF THE DRAWINGS

FIG. 5 is a front view of a two-part sliding block apparatus having an inert gas supply for electrogas welding;

FIG. 6 is a partial longitudinal section along line III—III in FIG. 5;

FIG. 7 is a partial cross-section along line I—I in FIG. 5; and

FIG. 8 illustrates a two-part sliding block apparatus having a sealing device for the welding region in electrogas welding.

DETAILED DESCRIPTION OF PREFERRED EMBODIMENTS

Figure 1:
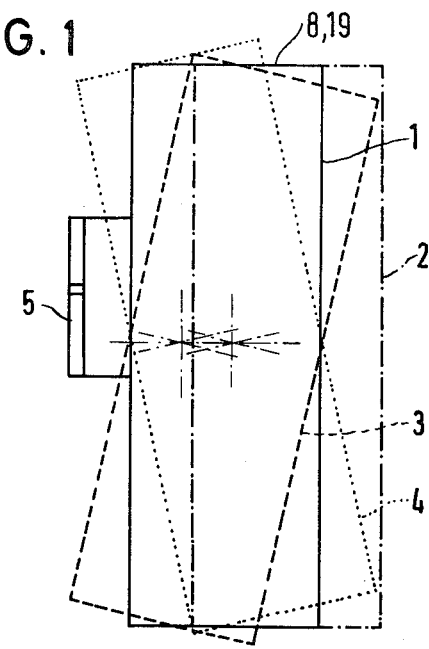
FIG. 1 schematically illustrates the movement possibilities of the sliding block apparatus according to the invention.

FIG. 1 schematically illustrates the movement possibilities of the sliding block according to the invention. A holder 10 (illustrated in FIGS. 2, 3 and 8) takes over guidance of two sliding block segments 8,19 which are adjacent in the centre plane of the welding gap 51 (see FIG. 8) and also takes over the power transmission from a machine frame (not shown). Each segment may move independently of the other in the holder in two directions, that is out of a starting position 1 in which the segments are pressed against the work pieces 38,44 to be welded with the surfaces lying in a plane. If these surfaces are not lying in a plane during the welding procedure, the segments are automatically moved so that they always remain pressed against each other with all of their surface. Where there is a parallel edge mismatch, one segment moves forwards in a parallel direction into position 2 and the other segment moves backwards. If the contour of one sheet of the welding does not match that of the other sheet, then each segment is able to move in a parallel direction into position 2 or to move backwards, or to perform a rotation, whereby the upper edge of the segments is moved in a clockwise direction into position 3 or anticlockwise into position 4. Sheet unevennesses which are longer than the segment length and a large edge mismatch may be reliably compensated as a result of these movement possibilities.

Figure 2:
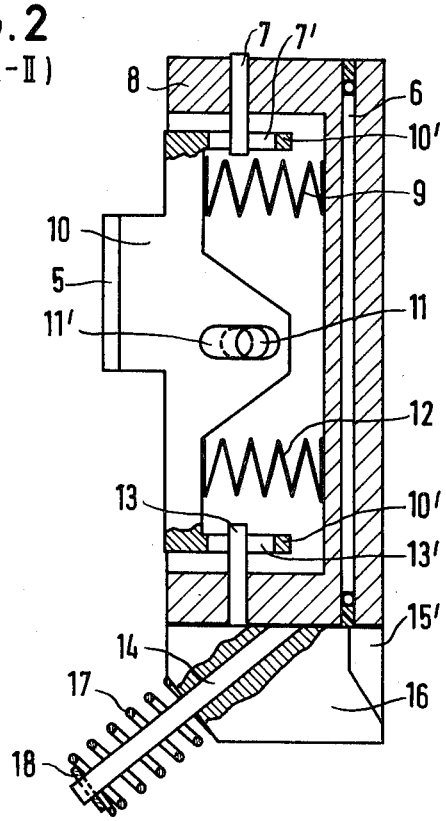
FIG. 2 is a longitudinal section through a two-part sliding block apparatus taken on the dashed line II—II in FIG. 3.
Figure 3:
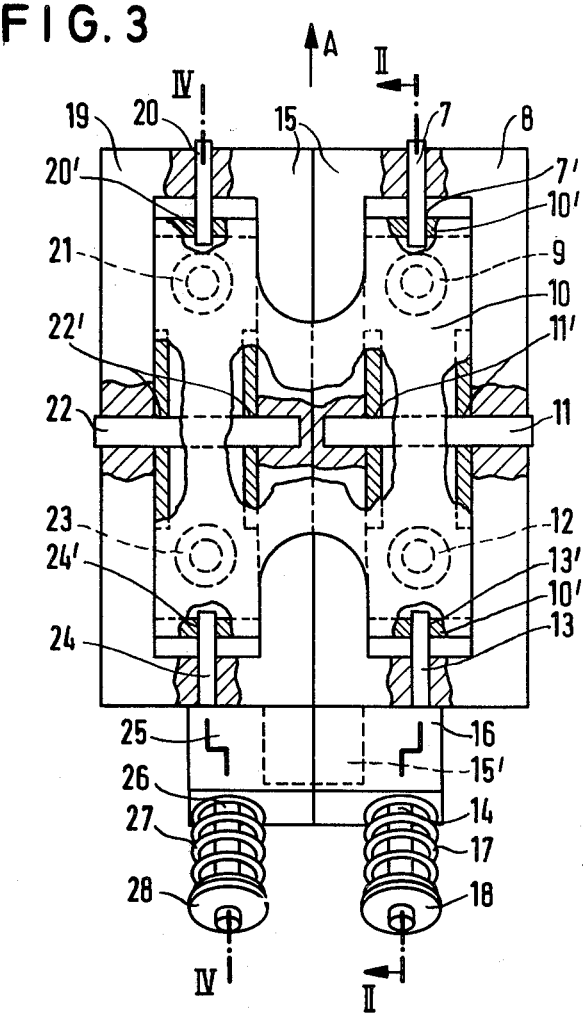
FIG. 3 is a rear view of the sliding block apparatus.

The movement mechanism according to the invention is illustrated in FIGS. 2 and 3. The sliding block segments 8,19 are guided laterally into slits 7',13' or 20',24' by two pegs 7, 13 or 20,24 which are opposite in a plane II—II or IV—IV parallel to the centre plane of the welding gap 51, in the holder 10, which is provided with a connecting member 5 for attachment to a machine frame. The pegs are firmly positioned on the sliding block segments 8,19. The slits 7',13' or 20',24' lying in these planes towards the work pieces 38 or 44, each in a respective projection 10' of the holder 10, are designed to be used as end stops and do not allow an expansion or longitudinal displacement of the segments, but do allow tilting about their centre axis.

Each peg 11 or 22, which is perpendicular to the centre plane of the welding gap 51, engages in two centre slits 11' or 22' of the holder 10. These slits are produced horizontally towards the work pieces in two planes which are spaced apart and are parallel to the centre plane of the welding gap and the slits also have end stops. As a result of these measures, the tilting action as well as the parallel movement of the segments is allowed whereby the necessary welding feed power is transmitted.

The necessary contact pressure force is transferred onto the work pieces 38 or 44 from the machine frame, via the holder 10, respective pairs of springs 9,12 and 21,23 with an adjustable initial tension, and the two segments 8 and 19, the welding gap 51 being located between the work pieces. In this region, the segments define, in known manner, a common longitudinal groove 15 which allows the production of a well-formed welding seam. Two sealing bodies 16 and 25 are positioned below the segments which, like the segments, are divided and are connected thereto. These sealing bodies also define a common longitudinal groove 15' which aligns with the longitudinal groove 15 and tapers off obliquely upstream of the lower end of each sealing body. The two sealing bodies are penetrated by obliquely positioned bolts 14 or 26. In each case, a spring 17 or 27, secured by a disc with a split pin 18 or 28, presses the sealing bodies against the corresponding segment 8 or 19 in a resilient manner such that they are pushed back by their longitudinal groove when a cambered weld seam occurs, without the sealing effect being appreciably impaired.

Figure 4:
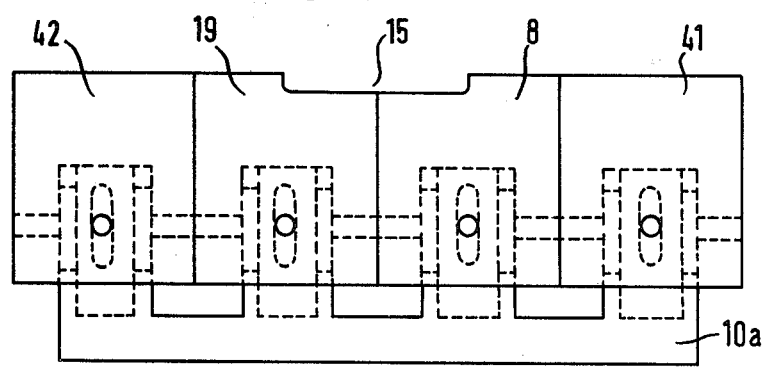
FIG. 4 is a top view of a four-part sliding block apparatus with the movement possibilities according to FIG. 1.

FIG. 4 shows a means for achieving an improved sealing effect, particularly for low-viscosity melts. Thus, in FIG. 4, two additional, independently movable segments 41 or 42 are closely suspended on the sides of the two segments 8,19 and they are held in an extended common holder 10a. These additional segments do not generally contain any cooling agent throughflow channels 6, as do the internal segments 8,19, because too much heat should not be removed from the work pieces. These additional segments 41 and 42 are preferably attached to the holder 10a in the same manner as the segments 8 and 19.

FIGS. 5 to 7 illustrate a sliding block apparatus having an inert gas supply for electro-welding. Gas supply nozzles 30, 29 are positioned on the sliding blocks 8 or 19 such that they participate in the movements of the sliding blocks. They are therefore designed to be separate in the centre plane of the weld seam 51 in the same manner and they are designed with guide plates 40 or 39 such that they are sealed off from the surroundings. The rear edge of the nozzle is bridged by a flexible sealing cap 31. In order to reduce the outlet velocity of the inert gas, the nozzles expand in a funnel-shape. In order to prevent an undesired injector effect, the outlet streams of the nozzles are curved so that they are not directly aimed at the weld.

It is advantageous in electrogas welding if a small compartment of the segments 32 and 49 which is divided in the same manner as the sliding blocks and is connected thereto is used for the welding region as illustrated in FIG. 8. The gas supply nozzles are then integrated in the compartment segments. The loss of inert gas is greatly suppressed by the lateral sealing strips 34 and 37. The strips are penetrated by respective bolts 45, each in a slit 48, and the strips are each pressed by respective spring 46 against the work pieces 38 or 44. During this operation, the springs are each secured to the compartment by a respective bolt 47. The welding process may be clearly observed through an opening 33 or 50 in the compartment which is covered with an inspection glass.

A pressure control device 36 positioned on the compartment of the segments 32,49 continuously maintains within a low inert gas excess pressure. A wire electrode lead 35 passes through the compartment wall. A suction opening 43 is provided in the compartment for removing inert gas and fumes which escape.

We claim:

1. A welding shoe for a vertical welding machine comprising a holder adapted to be connected to a member of said machine for moving said shoe along the surface of a pair of substantial planar workpieces arranged upright in edge to edge relation narrowly spaced from each other to form a vertical elongate welding gap, first and second sliding segments having surfaces adapted to be in contact with the surfaces of said workpieces, means for separately and independently mounting said sliding segments on said holder in edge to edge relation to define a longitudinal centre groove extending along the mid plane of said welding gap said mid plane being defined as passing through said welding gap perpendicular to the plane of said workpieces, said mounting means comprising a first swivel joint
    lying along a horizontal axis perpendicular to the mid plane of the welding gap, and a second swivel joint lying along a vertical axis parallel to the mid plane of the welding gap, each of said joints being set in slotted guides extending perpendicular to the vertical plane of the workpieces to permit movement of said respective segment toward and away from said workpiece while simultaneously permitting said respective segment to swivel independently about each of said joints, and spring means for resiliently biasing said segments away from said holder to maintain the surface of said segment normal in a vertical plane.

2. The welding shoe according to claim 1, wherein said holder includes a connecting member for removably connecting the holder to the machine frame.

3. The welding shoe according to claim 1, wherein each of said first swivel joints being perpendicular to said mid plane comprise pegs each of which being secured in the respective segment to extend through the slot provided therefor in said holder, each of said slots being formed in a first plane which extends parallel to said mid plane and is directed towards the work piece.

4. The welding shoe according to claim 1, wherein each of said second swivel joints parallel to said mid plane comprise two pegs which are secured at opposite ends of respective segments in a second plane parallel to said mid plane, each of which pegs extending into a slot provided as one of said slide guides, said slots lying in said second plane and being directed towards the work pieces, said slots being further formed in a projection of said common holder.

5. The welding shoe according to claim 1, wherein said spring means comprise compression springs positioned between each sliding segment and the common holder.

6. The welding shoe according to claim 1, wherein the spring means comprise pneumatic or hydraulic cylinders positioned between each sliding segment and the common holder.

7. The welding shoe according to claim 1, wherein the sliding segments are provided with at least one channel formed therein for the throughflow of a cooling agent.

8. The welding shoe according to claim 1, comprising a first and second sealing body mounted respectively on the underside of each sliding block, said bodies being mounted such that each is movable obliquely downwards in response to the formation of a cambered welding bead, said sealing bodies being closely adjacent in said mid plane and defining a common longitudinal groove being an extension of the centre longitudinal groove of the sliding segments and having an internal taper upstream of the lower end of each sealing body, to close said common longitudinal groove.

9. The welding shoe according to claim 8, wherein the sealing bodies are held on the respective segments by a bolt extending therethrough and secured in the respective sliding segment, said bolt being directed rearwardly, and obliquely downwards, and being provided a spring with an abuttment disc held by an attachment split pin.

10. The welding shoe according to claim 1, wherein each sliding segment is provided with an additional, identically-constructed segment, said additional segment being mounted closely and independently movably the lateral side thereof and segments being secured to said common holder.

11. The welding shoe according to claim 1, including an inert gas supply nozzle attached to each sliding block segment such that the nozzles orifices are closely adjacent said mid plane of the welding gap.

12. The welding shoe according to claim 11, wherein the inert gas nozzles are tapered outwardly in the direction of flow and their upstream ends are curved.

13. The welding shoe according to claim 11, wherein the inert gas supply nozzles include guide plates secured in a housing fixedly connected to the respective sliding segments.

14. The welding shoe according to claim 11, including a flexible sealing cap bridging the rear portion of the inert gas supply nozzles of each of said first and second segments.

15. The welding shoe according to claim 13, wherein the housing for the inert gas supply nozzles comprises an assembly of compartments divided along said mid plane, each of said compartments being formed by members secured respectively to one of said sliding segment.

16. The welding shoe according to claim 15, including a wire electrode supply line, extending through and supported by each of said housing compartments.

17. The welding shoe according to claim 15, including a pressure control sensor located in at least one of said housing compartments for controlling the inert gas supply.

18. The welding shoe according to claim 15, including a suction opening at the top of at least one of the housing compartments for the escape of inert gas and exhaust fumes.

19. The welding shoe according to claim 15, wherein at least one of the housing compartments has an opening provided with an inspection glass.

20. The welding shoe according to claim 15, including a sealing strip attached to the outer sides of each housing compartment each of said sealing strips being held by at least one bolt extending through said sealing strip and secured to said respective housing compartment, said sealing strip having a slot through which said bolt passes and which extends towards the work pieces, and spring means secured to the housing compartment to bias said sealing strips towards said workpieces.

21. A welding shoe according to claim 1, including sensing means for controlling the welding rate and the supply of welding flux, said sensing means being mounted in the interior of at least one of said segments in communication with the common longitudinal groove.

22. The welding shoe according to claim 3, wherein said slots being provided with adjustable end stops.

23. The welding shoe according to claim 4, wherein said slots being provided with adjustable end stops.

* * * * *